US011103950B2

(12) United States Patent
Elcic et al.

(10) Patent No.: US 11,103,950 B2
(45) Date of Patent: Aug. 31, 2021

(54) REMOVABLE WELDING WIRE SPOOL ARRANGEMENT FOR WELDING APPLICATIONS

(71) Applicant: ESAB AB, Gothenburg (SE)

(72) Inventors: Goran Elcic, Örebro (SE); Jeroen Dekker, Olofstorp (SE)

(73) Assignee: ESAB AB, Gothenburg (SE)

( * ) Notice: Subject to any disclaimer, the term of this patent is extended or adjusted under 35 U.S.C. 154(b) by 363 days.

(21) Appl. No.: 15/978,375

(22) Filed: May 14, 2018

(65) Prior Publication Data

US 2019/0344372 A1 Nov. 14, 2019

(51) Int. Cl.
*B23K 9/133* (2006.01)
*B23K 37/02* (2006.01)
*B65H 49/32* (2006.01)
*B65H 49/38* (2006.01)

(52) U.S. Cl.
CPC ........ *B23K 9/1333* (2013.01); *B23K 37/0247* (2013.01); *B23K 37/0294* (2013.01); *B65H 49/32* (2013.01); *B65H 49/38* (2013.01)

(58) Field of Classification Search
CPC ...... B65H 49/32; B65H 49/38; B65H 49/205; B23K 9/1333; B23K 37/0247; B23K 37/0294; B23K 37/00; B23K 9/173
See application file for complete search history.

(56) References Cited

U.S. PATENT DOCUMENTS

| 6,328,246 B1 * | 12/2001 | Hjort | A47K 10/3836 |
| | | | 242/422.5 |
| 6,905,089 B1 | 6/2005 | Solis et al. | |
| 7,243,876 B2 | 7/2007 | Robison | |
| 7,677,489 B2 | 3/2010 | Phillips | |

(Continued)

FOREIGN PATENT DOCUMENTS

| CN | 2917916 Y | 7/2007 |
| CN | 203212133 U | 9/2013 |

(Continued)

OTHER PUBLICATIONS

Extended European Search Report for European Patent Application No. 19173380.7-1016 dated Oct. 14, 2019, 11 pages.

(Continued)

*Primary Examiner* — William A. Rivera
(74) *Attorney, Agent, or Firm* — Edell, Shapiro & Finnan, LLC (57) ABSTRACT

A transportable spool carrier includes a spool hub configured to receive a welding wire spool thereon. A handle is disposed a distance above the spool hub greater than the radial size of the spool hub such that the welding wire spool is transportable via the transportable spool carrier. The handle is vertically aligned with the longitudinal center portion of the spool hub axis to align the handle with a center of gravity of the welding wire spool when the welding wire spool is coupled to the transportable spool carrier. The transportable spool carrier may include two spaced feet configured to (Continued)

support the welding wire spool on a surface when the transportable spool carrier is decoupled from the frame. The spool hub may include an expandable cylinder that, when radially expanded the welding wire spool is locked to the spool hub.

19 Claims, 6 Drawing Sheets

(56) References Cited

U.S. PATENT DOCUMENTS

| | | | | |
|---|---|---|---|---|
| 7,784,729 | B1* | 8/2010 | Hope | B65H 49/32 |
| | | | | 242/557 |
| 10,307,797 | B1* | 6/2019 | Newmeister | B08B 1/04 |
| 2003/0098383 | A1* | 5/2003 | Luo | B23K 9/1333 |
| | | | | 242/559 |
| 2004/0200819 | A1* | 10/2004 | Kensrue | B23K 9/133 |
| | | | | 219/137.7 |
| 2008/0315028 | A1 | 12/2008 | Maley | |
| 2009/0008492 | A1 | 1/2009 | Phillips | |
| 2010/0051596 | A1* | 3/2010 | Diedrick | B23K 9/1336 |
| | | | | 219/137.2 |
| 2012/0111843 | A1* | 5/2012 | Beard | B23K 37/0241 |
| | | | | 219/136 |
| 2014/0091129 | A1* | 4/2014 | Peters | B23K 37/0294 |
| | | | | 228/102 |
| 2015/0129568 | A1* | 5/2015 | Miller | B23K 37/0294 |
| | | | | 219/137.2 |
| 2015/0129700 | A1* | 5/2015 | Miller | B65H 49/205 |
| | | | | 242/139 |
| 2016/0289040 | A1* | 10/2016 | Schmitz | B65H 59/382 |
| 2018/0099834 | A1* | 4/2018 | Madrid | B65H 49/327 |
| 2020/0030919 | A1* | 1/2020 | Svedlund | B23K 9/10 |

FOREIGN PATENT DOCUMENTS

| | | |
|---|---|---|
| CN | 105800396 A | 7/2016 |
| JP | H06254681 A | 9/1994 |
| JP | 2007007684 A | 1/2007 |
| WO | 2007127042 A2 | 11/2007 |

OTHER PUBLICATIONS

A2 ESAB: "A2 Multirac", dated Oct. 7, 2009, XP055620690, retrieved from the Internet: URL:http://pdfmanuals.esab.com/private/Library/InstructionManuals/0449%20165%20160%20GB.pdf [retrieved on Sep. 10, 2019].

Examination Report No. 1 for Australian Application No. 2019203339 dated Mar. 13, 2020, 5 pages.

Office Action for Canadian Patent Application No. 3,042,540 dated Aug. 4, 2020, 5 pages.

First Office Action for Chinese Patent Application for Invention No. 201910395674.9 dated Oct. 12, 2020, 18 pages.

Examination Report No. 3 for Australian Patent Application No. 2019203339 dated Mar. 1, 2021, 8 pages.

Office Action for Canadian Patent Application No. 3,042,540 dated Mar. 8, 2021, 6 pages.

Examination Report No. 2 for Australian Patent Application No. 2019203339 dated Dec. 18, 2020, 6 pages.

Second Office Action by the China National Intellectual Property Administration for Chinese Application for Invention No. 201910395674.9 dated May 17, 2021 with English translation, 34 pages.

* cited by examiner

REMOVABLE WELDING WIRE SPOOL ARRANGEMENT FOR WELDING APPLICATIONS

FIELD OF THE DISCLOSURE

The disclosure generally relates to welding equipment, and more particularly to a transportable welding wire spool hub for welding applications.

BACKGROUND OF THE DISCLOSURE

Welding tractors are known and can be used in a variety of applications to provide for repeatable and reliable automated welding. Existing welding tractors often include a variety of components, such as a welding head, one or more welding wire spools, a flux container, system electronics, and the like, all of which can be attached directly or indirectly to a boom or central architectural component of the tractor. As the tractor moves along a welding path, wire from the welding wire spools is paid out to a position adjacent the welding head where the welding wire can be melted into the weld joint. Examples of such tractors are the A2 Multitrac and A6 Mastertrac models sold by ESAB Welding & Cutting Products of Denton, Tex.

Welding tractors are often used in remote locations, such as compartments of ships under construction or repair. For such applications, the tractor and its individual components must be carried to the remote location. Welding wire spools, for their part, can be heavy (e.g., 25-30 kilograms, depending on wire type). To load the welding wire spool onto the welding tractor, the spool must be manually carried from a storage location to the welding tractor, and then loaded onto a hub that is part of the tractor structure. Currently, such loading actions are not ergonometric and can result in substantial strain on the user's back.

It would, therefore, be desirable to provide a lifting and transport device that can be used to facilitate carrying a welding wire spool to a remote location in a manner that avoids injury to the user. The lifting and transport device should also facilitate mounting of the welding wire spool to a welding tractor in an ergonometric manner that also avoids injury to the user. It is with respect to these and other considerations that the present improvements may be useful.

SUMMARY

This Summary is provided to broadly set forth concepts that are described in detail below in the Detailed Description. This Summary is not intended to identify key features or essential features of the claimed subject matter, nor is it intended as an aid in determining the scope of the claimed subject matter.

An arrangement is disclosed in which a welding wire spool is removably mounted on a welding tractor using a lifting and transport aid, referred to herein as a transportable spool carrier. The transportable spool carrier includes a handle to facilitate grasping and carrying by a user and, in some embodiments, may include one or more wheels to make transportation less stressful on the user. In some embodiments, the lifting and transport aid may have a quick connection feature to facilitate easy coupling or attachment of the welding wire spool to the welding tractor. In some embodiments a locking mechanism is provided to prevent the spool carrier from falling off, or inadvertently separating from, the welding tractor. This can be advantageous when the welding tractor is being lifted using a crane or other lifting device. The locking mechanism may be a part of a handle of the transportable spool carrier, or it may be a separate locking mechanism.

Advantages of the transportable spool carrier include allowing the user to lift the heavy welding wire spool alongside the user's body instead of in front of the body, thus avoiding back strain. The integrated handle may facilitate easier and less demanding lifting and transportation of the welding wire spool. In some embodiments, only one hand may be needed to lift the welding wire spool, leaving the other hand is free. The result is an easier and less demanding way of carrying a welding wire spool and loading the spool onto a welding tractor.

A transportable spool carrier for carrying a welding wire spool includes a frame, spool hub secured to the frame, the spool hub having an axis and configured to coaxially receive and be selectively coupled to a welding wire spool having an annular outer edge of known radial distance from said axis, To facilitate lifting and carrying the welding wire spool via the transportable spool carrier, a handle is disposed a distance above the spool hub greater than the known radial distance and vertically aligned with a longitudinal center portion of the spool hub axis to thereby align the handle with a center of gravity of the welding wire spool when the welding wire spool is coupled to the spool hub. The handle may be aligned parallel or orthogonally to the spool hub axis. Two spaced feet may be provided at the bottom of the frame and configured to support the carried welding wire spool on a horizontal surface. An attachment member may be disposed between the handle and the feet and configured to selectively couple the transportable spool carrier to a frame of a welding tractor. The attachment member may be a frame support element configured to selectively couple the spool carrier to the tractor frame.

The transportable spool carrier may be configured for removably attaching a welding wire spool to a rectangular box-like body on a welding tractor. The spool hub of the carrier may be configured to receive the welding wire spool, and the handle may be aligned with a longitudinal center portion of the spool hub to thereby align the handle with a center of gravity of the welding wire spool when the welding wire spool is coupled to the transportable spool carrier. Thus arranged, the welding wire spool is readily manually transportable via the transportable spool carrier.

A locking mechanism may be configured for selectively securing the transportable spool carrier to a frame of a welding tractor. The spool carrier may be configured to selectively lock the welding wire spool thereto, for example with a spool hub of the spool carrier that is a radially expandable cylinder such that in a first configuration the welding wire spool is slidably mountable onto the spool hub, and in a second configuration the welding wire spool is expanded to lock the welding wire spool to the spool hub.

A method of removably mounting a welding wire dispensing spool on a welding tractor is disclosed and includes: removably connecting a spool holder to a welding wire dispensing spool with a spool hub axially received in a through hole in a central core of the spool, and with a handle of the spool holder spaced vertically above a rotation axis of the spool hub at a distance greater than the radius of opposed annular flanges on opposite sides of the spool; and removably attaching the spool holder with the spool attached to a welding tractor. Removably connecting the spool holder to the spool may include vertically aligning the handle with an axially central portion of the spool hub with the handle orthogonally oriented to the spool hub; alternatively, removably connecting the spool holder to the spool may include vertically aligning the handle with an axially central portion of the spool hub with the handle extending parallel to the spool hub.

A welding tractor is disclosed, comprising a base, a frame coupled to the base, an attachment member coupled to the frame, and a transportable spool carrier including a spool hub configured to receive a welding wire spool thereon. The transportable spool carrier may include a structure for removably engaging the tractor attachment member. The transportable spool carrier may also include a handle disposed a distance from the carrier hub such that the welding wire spool is transportable via the transportable spool carrier. A connector or attachment member may be configured for selectively connecting the spool carrier to a frame of a welding tractor. A handle may be aligned with a center portion of the spool carrier to thereby align the handle with a center of gravity of the welding wire spool when the welding wire spool is coupled to the spool carrier. The handle may include a foot configured to support the welding wire spool when the transportable spool carrier is detached from the frame.

The transportable spool carrier is configured for removably attaching a welding wire spool to the rectangular body. The carrier may be configured to receive the welding wire spool. A handle may be aligned with a center portion of the spool hub to thereby align the handle with a center of gravity of the welding wire spool when the welding wire spool is coupled to the transportable spool carrier, such that the welding wire spool is transportable via the spool carrier. First and second feet may be disposed at an end of the spool carrier opposite the handle. The first and second feet may be configured to stably support the spool carrier on a surface when the carrier is decoupled from the welding tractor.

BRIEF DESCRIPTION OF THE DRAWINGS

By way of example, a specific embodiment of the disclosed device will now be described, with reference to the accompanying drawings, in which.

DETAILED DESCRIPTION OF THE DRAWINGS

The presently disclosed embodiments are described more fully hereinafter with reference to the accompanying drawings, in which several exemplary embodiments are shown. The subject matter of the present disclosure, however, may be embodied in many different forms and should not be construed as limited to the embodiments set forth herein. Rather, these embodiments are provided so that this disclosure will be thorough and complete, and will fully convey the scope of the subject matter to those skilled in the art. In the drawings, like reference numbers refer to like elements throughout.

Terminology: It is to be understood that, unless otherwise stated or contextually evident, as used herein:

The terms "upper", "top", "lower", "bottom", "vertical", "horizontal", etc., are used for convenience to refer to the normal orientation of a transportable spool carrier and related elements and components when in use in a welding tractor as described herein and are not intended to otherwise limit the structures described and claimed.

The terms "axial" and "axially" as used herein refer to the direction of the central longitudinal axis of the spool, tube or other component as understood by context.

The terms "radial" and "radially" as used herein refer to the direction perpendicular to the component axis.

The present disclosure relates to a welding wire spool carrier for a welding tractor assembly that is portable and ergonomic for a user, and that can eliminate problems of prior arrangements that are more cumbersome, and that in extreme cases can cause injuries to a user. The presently disclosed welding wire spool carrier may be removable, along with an associated welding wire spool, so that it may be separately transportable from the rest of the welding tractor. The disclosed arrangements thus provide for a transportable welding tractor that a user can safely and comfortably move without risk of injury and quickly move between jobs, resulting in less downtime between welding operations.

It will be appreciated that although the description will proceed in relation to a welding wire spool carrier for use with a welding tractor, the disclosed arrangement of a welding wire spool carrier is not so limited. Thus, it will be appreciated that the disclosed welding wire spool carrier can be used in any of a variety of welding applications, including those that do not include a welding tractor.

Figure 1:
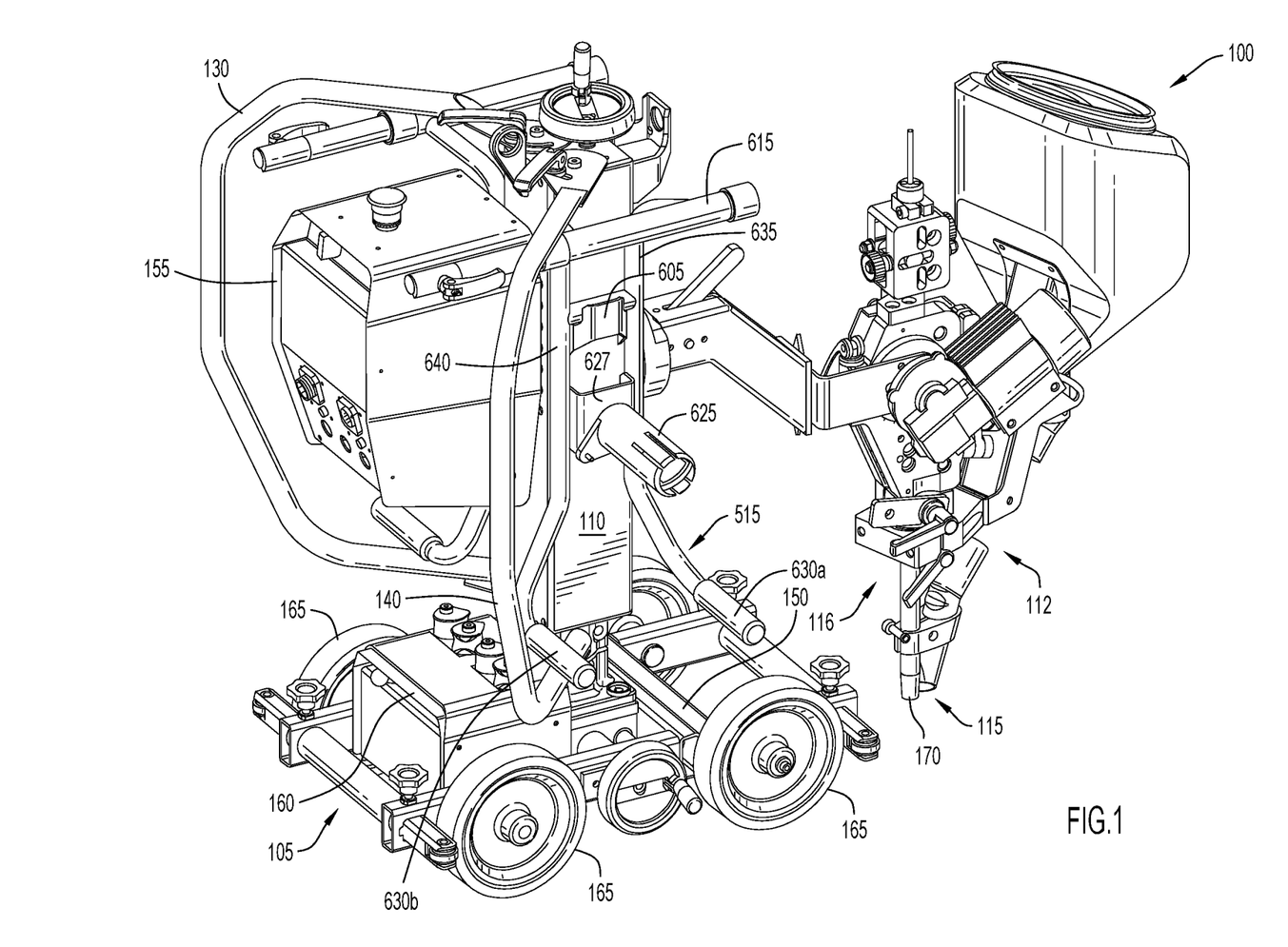
FIG. 1 is a perspective view of a welding tractor with a transportable welding wire spool carrier attached to a side portion thereof in accordance with the present disclosure.
Figure 2:
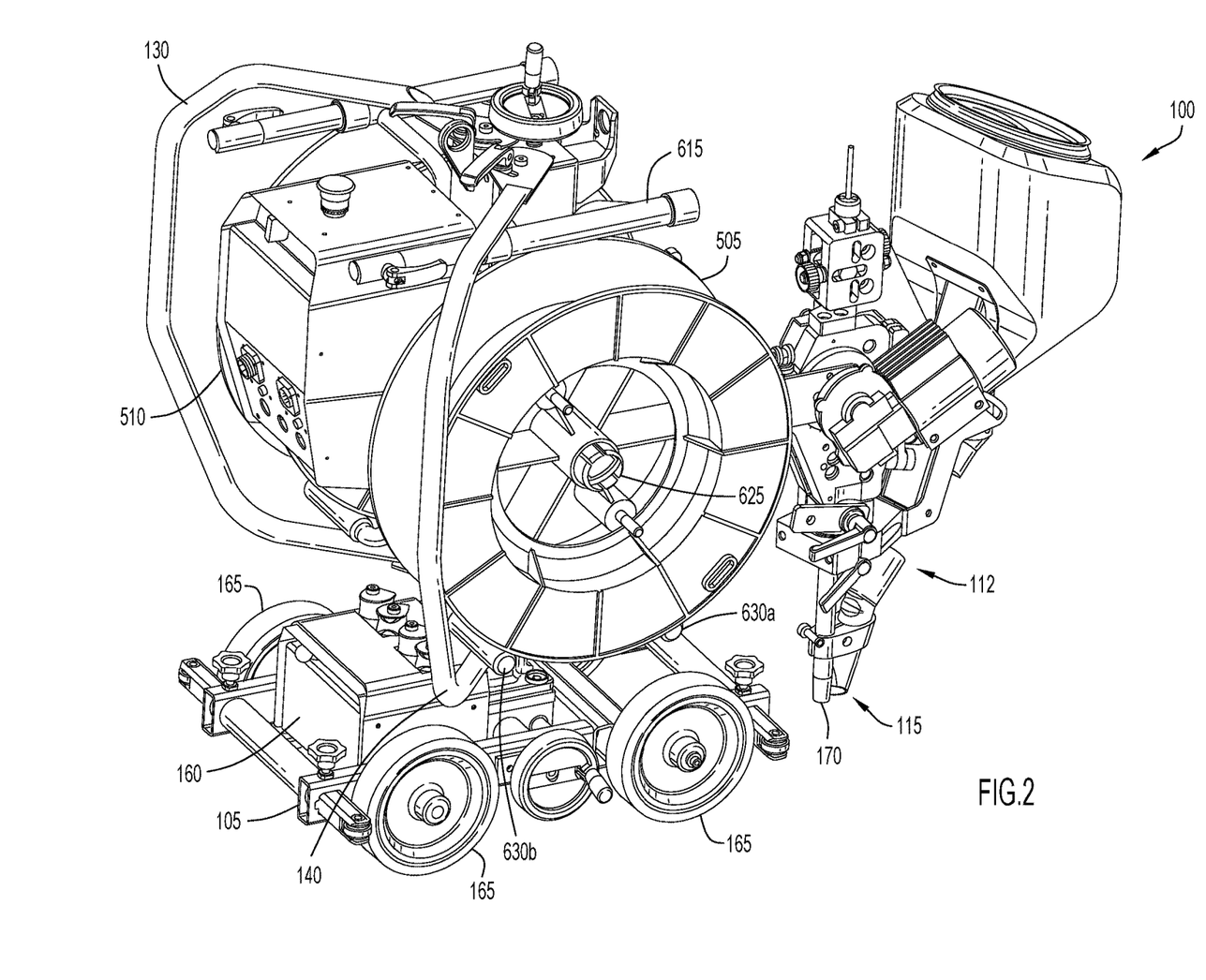
FIG. 2 is a perspective view of the welding tractor of FIG. 1 with a welding wire spool attached to the transportable spool carrier.

FIGS. 1 and 2 illustrate a non-limiting example of a welding tractor 100 engaging a welding wire spool carrier 515. The welding tractor 100 may include a base 105 and a frame 110. The frame 110 may have a bottom end coupled to the base 105 and a top end spaced vertically above the base 105. In the illustrated embodiment, the frame 110 is in the form of a vertical boom, although this is not critical and other shapes and arrangements can be used. The frame 110 may be coupled to a control box 155, an electrical component box 160, a welding head 115, and a flux feeding system 112. The frame 110 may be removably attachable to the base 105, although this is an optional feature. The frame 110 may, in some embodiments, be an elongated member having a rectangular transverse (i.e., horizontal) cross-section, with a cross-sectional dimension not wider than that of the base 105, although this is not critical and other sizes can be used. The frame 110 may be configured for easy carrying, and the illustrated embodiment shows the frame to be box-shaped. Control box 155 and electrical component box 160 may be separately attachable to the frame 110.

The base 105 may be configured to support each of the elements of the welding tractor 100, for example, the frame 110, welding head 115, control box 155 and electrical component box 160. For example, the base 105 may be in the form of a chassis, or other structural configuration to support the aforementioned components. The base 105 may include a plurality of wheels 165 to movably support the base 105 on a surface, such that the welding tractor 100 may be movable along the surface via the wheels 165. In some embodiments, the welding tractor 100 may be configured to follow a predefined weld groove formed by or between opposing plate (or other workpiece) sections disposed on the surface, or which form the surface upon which the welding tractor may move during operation.

The welding head 115 is attached to the frame 110 at a forward end of the welding tractor. The welding head 115 may include a variety of known welding components such as a welding torch 116, a contact tube 170, and a position sensor (not shown), and may also be coupled to, or carry, the flux feeding system 112 for dispensing flux into the weld groove ahead of the welding torch. In some embodiments, the welding tractor 100 may include first and second handles 130, 140 disposed at a rearward end of the frame 110. In some embodiments, the handles 130, 140 may be rotatably connected to the frame 110 so that, during a welding operation, the handles may be rotated to a position transversely outward from the frame, as shown in FIG. 1. For disassembly and/or transport of the welding tractor 100, the handles 130, 140 may be rotated toward one another to a mutually proximate position at the rearward end of the frame 110 so that the frame 110 may be easily carried by the handles.

As shown in FIG. 2, the welding tractor 100 may be configured to allow the attachment and carriage of one or more welding wire spools 505, 510. The spools 505, 510 may be disposed on opposite sides of the welding tractor 100 between the tractor forward and rearward ends. The spools are conventional in configuration and include a cylindrical core about which welding wire is wound and two spaced annular discs of substantially greater radius than the core secured coaxially with and at opposite ends of the core. The wire spools 505, 510 may be attached to the welding tractor 100 in an identical manner, and thus for ease of understanding the present description, reference to the attachment of only welding wire spool 505 will be described. Although the illustrated embodiment includes a pair of welding wire spools 505, 510, it will be appreciated that only one spool may be used in some instances.

The welding wire spool 505 may be removably coupled to the frame 110 of the welding tractor 100 using a transportable spool carrier 515. As shown in FIGS. 3A, 3B, 4A, and 4B, the transportable spool carrier 515 may include at least a first tubular frame element 635 and a second tubular frame element 640, with at least a mid-portion 635a of tubular frame element 635 and a mid-portion 640a of tubular frame element 640 being substantially vertical and parallel to each other. The tubular frame elements 635, 640 may be coupled in spaced relation at their upper ends via a tubular handle portion 615 secured to and extending between them. The frame elements 635, 640 may be coupled in spaced relation at an intermediate portion via a tubular frame support element 610 that is shorter than handle potion 615. In the illustrated embodiment the handle portion 615 and the frame support element 610 may be oriented substantially parallel to each other, and substantially perpendicular to the mid-portions 635a, 640a of tubular frame elements 635, 640. This arrangement may result in a tubular framed "box" arrangement which provides structural stability to the transportable spool carrier 515.

Each of the tubular frame elements 635, 640 may have respective first and second feet 630a, 630b, respectively, disposed at the bottom end of the transportable spool carrier 515. The feet 630a, 630b may be oriented substantially perpendicular to the portions 635a, 640a of the tubular frame elements 635, 640 such that the feet are oriented horizontally in parallel spaced relation when the spool carrier 515 is placed on a flat surface. As can be seen best in FIG. 3A, the feet 630a, 630b may be separated by a distance that is greater than the distance between the portions 635a, 640a of tubular frame elements 635, 640 so that when the spool carrier 515 is placed on a flat surface the horizontally spaced feet provide a stable support structure for the spool carrier and a welding wire spool placed thereon.

The hollow tubular frame elements 635, 640, 610, handle portion 615, and feet 630a, 630b, as well as all tube elements described herein, may be formed of a lightweight material (e.g., aluminum or aluminum alloys) that is sufficiently strong to resist bending when structurally supporting a fully loaded wire welding spool.

The transportable spool carrier 515 is preferably easily attached to and removed from the tractor frame 110 so that it can be carried about with a spool attached. For example, the frame 110 may include an attachment member in the form of a bracket 135 disposed on a side surface thereof, configured to receive at least a portion of the tubular frame support element 610 of the spool carrier 515. In an embodiment, the bracket 135 may include an upward facing cutout 136 which may form a recess between the frame 110 and the bracket 135. In the illustrated embodiment, the cutout 136 may include a curved surface having a diameter approximately the same as, or slightly greater than, the diameter of the frame support element 610 of the spool carrier 515. When being attached to the frame the spool carrier 515 may be lifted so that the frame support element 610 is briefly held above the bracket 135. Once the support element 610 is aligned over the bracket 135, it can then be lowered into and engaged in the recess between the cutout 136 and the frame 110. The weight of the spool carrier 515 can secure the carrier in place between the bracket and the frame 110 when the carried spool is in use. The bracket 135 is thus configured to receive and support the spool carrier 515 against the frame 110. As the welding wire spool 505 is typically heavy when loaded with welding wire, the bracket 135 and its engagement with frame 110 should be configured to be strong enough to withstand the weight of the welding wire spool and wire without distorting the bracket. In the illustrated embodiment, the bracket 135 comprises a plate element that is bent to form a substantially U-shape in cross-section, and that can be welded to the frame 110 at a desired location. It will be appreciated, however, that this is merely an example, and that the bracket can be implemented in a variety of other ways to support the carrier on the tractor frame without departing from the scope of the disclosure.

Figure 3A:
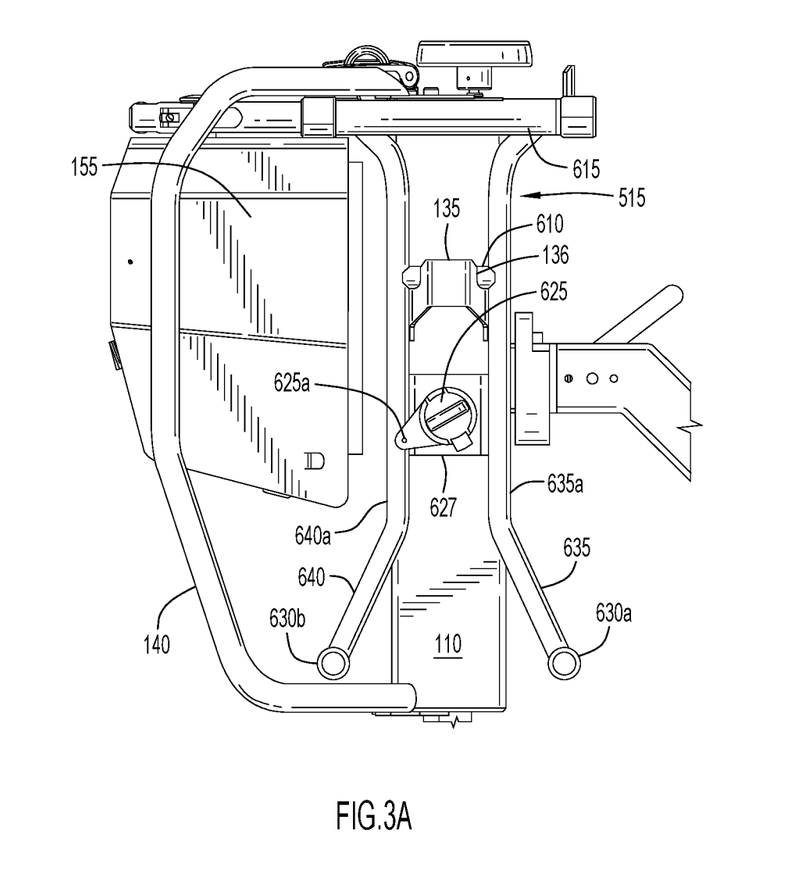
FIG. 3A is a side view of the welding tractor and transportable spool carrier of FIG. 1.
Figure 3B:
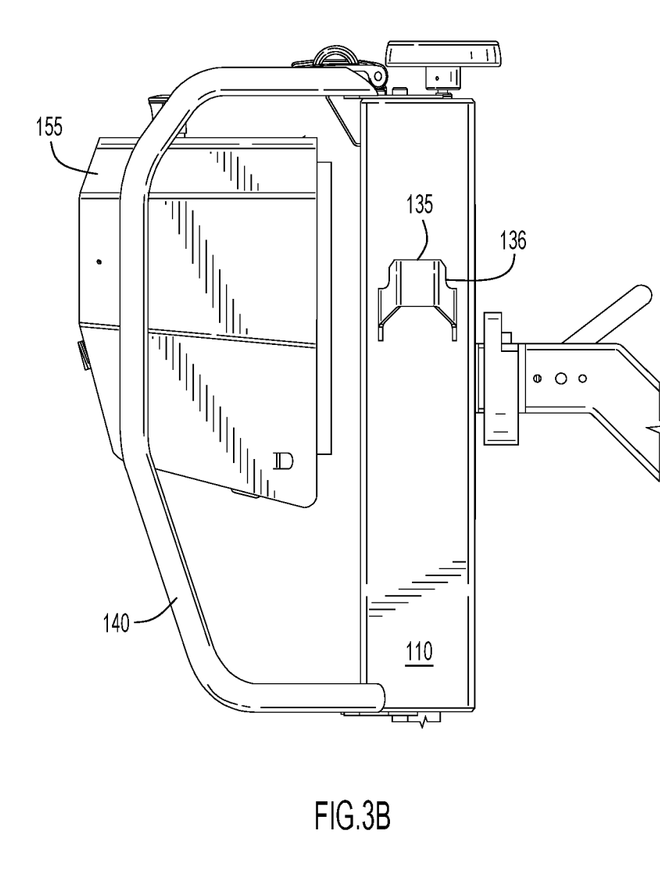
FIG. 3B is a side view of the welding tractor of FIG. 1 with the transportable spool carrier removed.

FIG. 3A shows the transportable spool carrier 515 attached to the frame 110 via bracket 135. To remove the spool carrier from the frame a user may simply grasp the spool carrier via the handle portion 615 and lift the carrier until the tubular frame support element 610 is clear of the cutout 136 of the bracket 135. FIG. 3B shows the frame 110 and bracket 135 without the transportable spool carrier 515 in place.

Figure 4A:
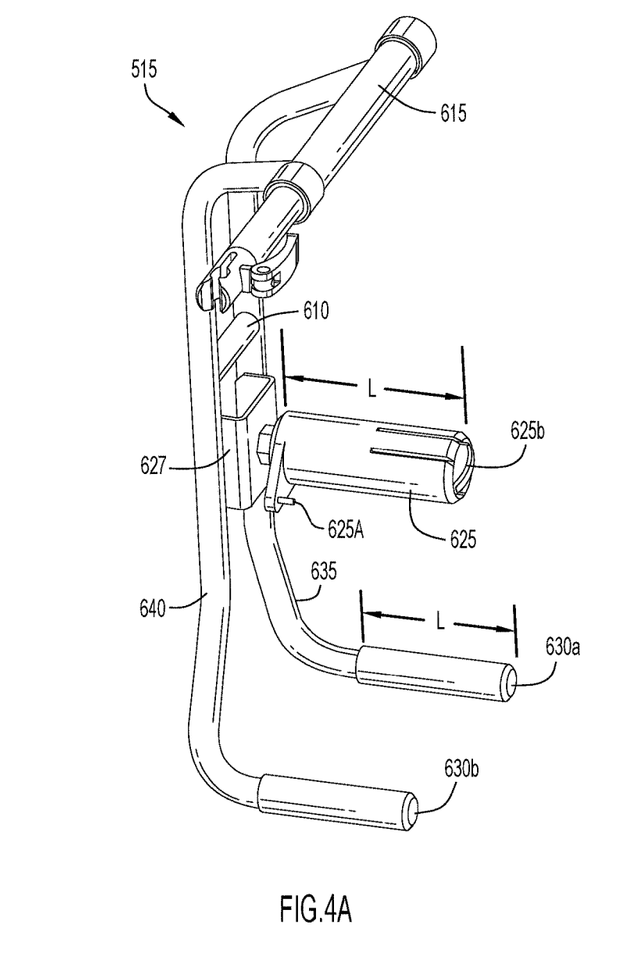
FIG. 4A is an isometric view of the transportable spool carrier of FIG. 1.

The transportable spool carrier 515 may be configured to hold a spool 505 of welding wire wound about its core. As noted above, the spool is conventional in that it is comprised of a core with a central horizontally extending axis about which welding wire is wound, and first and second annular discs axially spaced on opposite sides of the core. As shown in FIGS. 3A and 4A, the spool carrier 515 may include a spool hub 625 projecting axially from a bracket 627 coupled between parallel portions 635a, 640a of tubular frame elements 635, 640. In the illustrated embodiment the spool hub 625 projects horizontally from an intermediate portion of the spool carrier 515 such that the carried welding wire spool 505 fits between the handle portion 615 and the feet 630a, 630b. The spool hub 625 may be a generally cylindrical member sized and configured to be received coaxially within a central opening in the core of the welding wire spool 505. The length "L" of the spool hub 625 may, in some embodiments, be substantially equal to the transverse dimension "L" between the annular side discs of the welding wire spool 505.

Figure 4B:
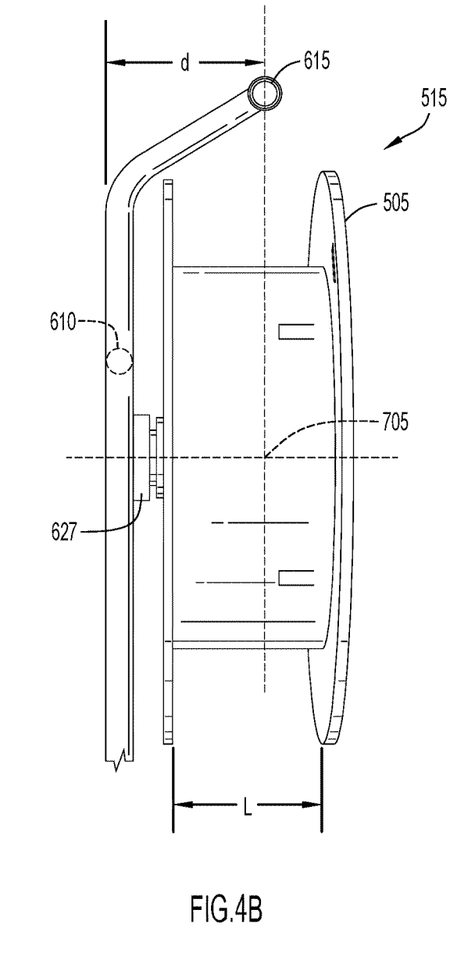
FIG. 4B is a partially diagrammatic front view of the transportable spool carrier of FIG. 3A with a spool of welding wire attached thereto.

As shown in FIGS. 4A and 4B, the handle portion 615 of the transportable spool carrier 515 is positioned vertically above the spool hub 625 and spaced therefrom by a distance slightly greater than the radius of the spool side discs. In the illustrated embodiment, the first and second tubular frame elements 635, 640 may be bent at the upper end of the spool carrier so that the elements extend out of the plane defined by parallel portions 635a, 640a. The handle portion 615 may thus be positioned a distance "d" away from the plane defined by portions 635a, 640a. This distance "d" preferably corresponds to a position at which the handle portion 615 vertically overlies an axially central portion the axis of the spool hub 625 in orthogonal relation. Thusly arranged, when a user holds the transportable spool carrier 515 by the handle portion 615 so as to suspend the carrier, and a welding wire spool 505 is attached and/or detached to the spool hub 625, the handle portion 615 is aligned with a center of gravity 705 of the welding wire spool 505. In this way, during transport, attachment and/or detachment from the frame 110, the transportable spool carrier 515 may remain substantially vertical so as to be perpendicular to a surface 150 of the base 105 of the welding tractor 100. This is advantageous in that a user can more easily align the vertically suspended spool carrier 515 with the frame 110 and bracket 135. It will be appreciated that if the handle portion 615 did not extend to overlie the center of gravity 705 of the welding wire spool 505, the spool carrier 515, when lifted, would tend to tilt to an angle non-perpendicular to the surface 150 of the base 105, increasing the difficulty for transport, attachment, and detachment of the spool carrier and welding wire spool.

As mentioned above, the transportable spool carrier 515 may include first and second feet 630a, 630b at a bottom end thereof so that the spool carrier 515 can independently support a welding wire spool 505 when detached from the frame 110 of the welding tractor 100 and placed on a surface (e.g., during storage and before attaching the spool carrier to the frame 110). In some embodiments, the feet 630a, 630b may extend to at least the length L equal to the axial length of the spool hub 625, so that each foot extends to or past the welding wire spool 505, thereby providing enhanced stability.

The spool hub 625 may be a generally cylindrical member that is sized and configured to be received coaxially within the cylindrical center opening in the core of a welding wire spool 505. The spool hub 625 may include axial and rotational locking features to selectively positionally lock the welding wire spool 505 to the transportable spool carrier 515. The rotational locking feature may include a pin 625a disposed on a flange extending radially from the proximal end of the cylindrical hub and configured to engage a corresponding recess or other feature of the welding wire spool 505 to prevent free rotation of the welding wire spool about hub 625 when thusly engaged. As will be appreciated, this prevents wire from unreeling inadvertently when the welding wire spool 505 is attached to the spool hub.

The axial locking feature may comprise a radial expansion feature in the spool hub 625. In a first, unlocked, configuration, the spool hub 625 may assume a first radial dimension that is suitable for being received in the central opening of welding wire spool 505. In a second, locked, configuration, the spool hub 625 may be expanded radially outward against an inner surface of the core of the spool 505, creating an interference fit between the spool hub 625 and the spool 505. In one embodiment, this expansion is facilitated by rotation of a nut 625b disposed at a distal end of the spool hub 625. It will be appreciated that this is only one example embodiment of an axial locking feature, and that others (e.g., a pin diametrically disposed through the hub, etc.) may be used without departing from the spirit of the disclosure.

Figure 5A:
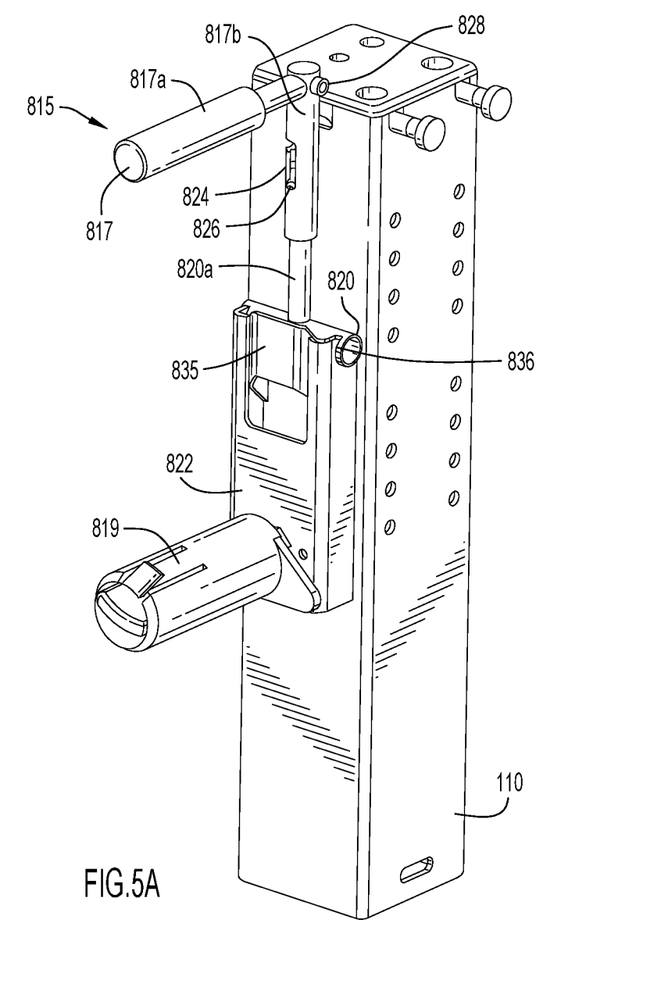
FIGS. 5A and 5B are isometric views of another embodiment of a transportable spool carrier for use with the welding tractor of FIG. 1.
Figure 5B:
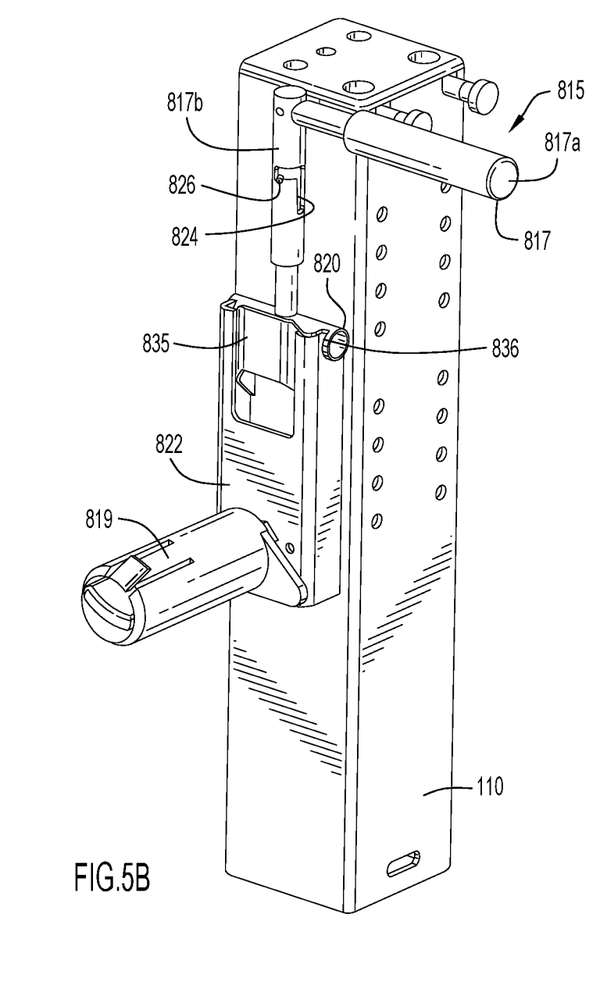

Referring now to FIGS. 5A and 5B, a further embodiment of a transportable spool carrier 815 for use with the welding tractor 100 of FIG. 1 will be described. Although not shown in figures FIGS. 5A and 5B, the transportable spool carrier 815 may, in some embodiments, include a support frame that may include first and second feet 630a, 630b described in relation to FIG. 4A and not shown in FIGS. 5A and 5B to preserve clarity. To further preserve clarity, the transportable spool carrier 815 is described below in relation to the tractor frame 110 absent the remaining elements of the welding tractor 100. In this embodiment, a handle 817 of the transportable spool carrier 815 is rotatable so that in a first position (FIG. 5A) the handle is deployed to lift or otherwise manipulate the spool carrier, while in a second position (FIG. 5B) the handle can be stowed so as not to interfere with unspooling of the welding wire or other operation of the welding tractor 100. In the second position the handle may also lock the transportable spool carrier 815 to the frame 110. The transportable spool carrier 815 may further include a spool hub 819 for releasably engaging the core of a welding wire spool 505 in the manner previously described in relation to FIGS. 4A and 4B.

The handle 817 may be coupled to a bracket engaging support member 820 that is receivable in a cutout 836 of the attachment bracket 835 of the frame 110 to couple the transportable spool carrier 815 to the frame 110 (and welding tractor 100) in the manner similar to that previously described in relation to FIGS. 4A and 4B. The handle may include a grip portion 817a that is generally perpendicular to a cylindrical attachment tube 817b that extends parallel to the front-facing vertical surface of frame 110 and rotatably and vertically slidably engages a vertically extending tube portion 820a of the bracket engaging support member 820. The bracket engaging support member 820, when engaged in cutout 836, is coupled to a spool hub engaging portion 822 of bracket 835 which, in turn, is coupled to a spool hub 819. The spool hub 819 of this embodiment may have any and/or all features of the spool hub 625 previously described in relation to FIGS. 4A and 4B, and thus description of those features will not be repeated here.

As mentioned, handle 817 may be rotatable from a deployed first position to a stowed second position. In the first position, the grip portion 817a is extended so that it is oriented parallel to and vertically aligned with the axis of the spool hub 819 (FIG. 5A) about which a supported spool rotates. In the second position, the handle portion 817a is oriented generally orthogonally of the longitudinal axis of the spool hub (FIG. 5B). When in the deployed position the handle 817 may be gripped by a user so that the user can engage and disengage the transportable spool carrier 815 and attached welding wire spool 505 with respect to the frame 110 and welding tractor 100. When in the stowed position, the grip portion 817a of the handle 817 is positioned such that it does not interfere with unspooling of wire from the welding wire spool 505). In the stowed position, the handle 817 may also positionally lock the spool carrier 815, along with an attached welding wire spool 505, to the frame 110, as described in greater detail below.

In the illustrated embodiment, spool hub 819 is coupled to spool hub engaging portion 822 of spool carrier 815 such that the carried welding wire spool 505 (FIGS. 1, 2) may be positioned directly below the grip portion 817a of the handle 817. As with previously described embodiments, the spool hub 819 may be a generally cylindrical member sized and configured to be received within a central opening of the welding wire spool 505, and the length of the spool hub can be substantially equal to the transverse dimension "L" between the opposed discs of the welding wire spool 505 (FIG. 4B).

Thusly arranged, the grip portion 817a of the spool carrier 815 may be positioned over the spool hub 819 (in the deployed position of FIG. 5A) so that when a user holds the spool carrier 815 via the grip portion 817a, and a welding wire spool 505 is attached and/or detached to the spool hub 819, the grip portion is vertically aligned with a center of gravity 705 (FIG. 4B) of the welding wire spool. In this way, during transport, attachment, and/or detachment from the frame 110, the transportable spool carrier 815 may be naturally suspended without skewing from substantially vertical so as to be perpendicular to a surface 150 (FIG. 1) of the base 105 of the welding tractor 100. This is advantageous in that it can allow a user to more easily align the spool carrier 815 with the frame 110. It will be appreciated that if grip portion 817a is not vertically aligned with the center of gravity 705 of the welding wire spool 505, the spool carrier 815 and spool 505, when lifted, would tend to tilt in a vertical plane about the grip portion 817a, thereby increasing the vertical force required to effect vertical lifting and the difficulty for transport, attachment, and detachment of the spool carrier and welding wire spool to the frame 110.

Figure 6A:
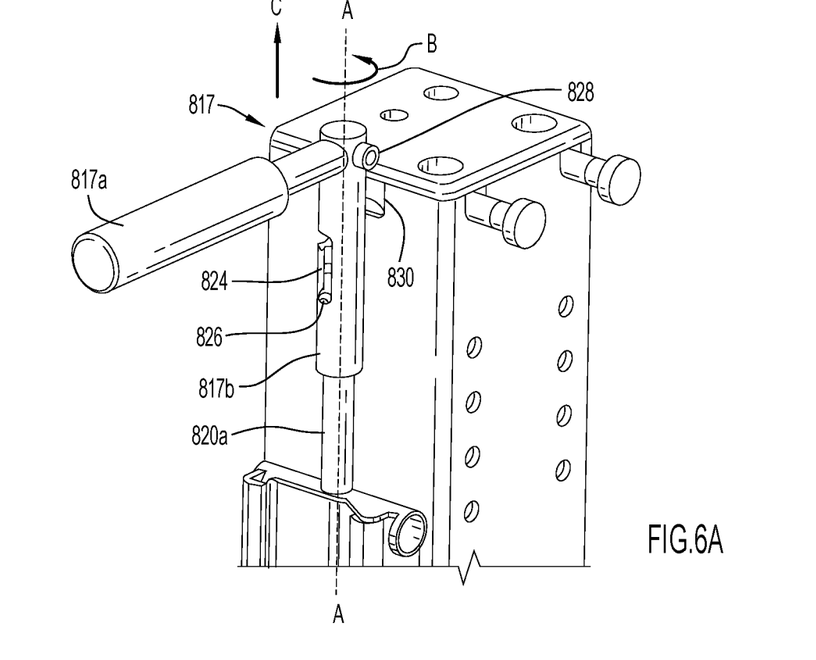
FIGS. 6A and 6B are detailed isometric views of a locking feature of the transportable spool carrier of FIGS. 5A and 5B.
Figure 6B:
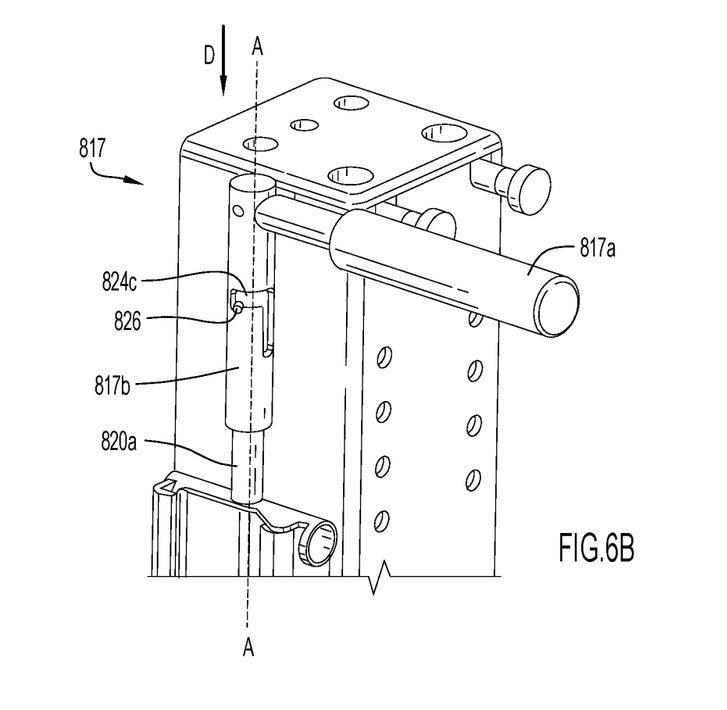

As shown in FIGS. 6A and 6B, the attachment tube 817b of the handle 817 may include a channel 824 that slidably receives a stop pin 826 projecting radially from vertically extending tube portion 820a of the bracket engaging member 820. The channel 824 includes a relatively short top section 824c defined angularly in tube portion 820a, and a longer section 820a extending perpendicularly downward from an end of short 824c. In addition, an upper end of the attachment tube 817b of the handle 817 includes a laterally projecting stub 828 which may be received within a recess 830 in the frame 110 when the handle is in its stowed position.

In the deployed position (FIGS. 5A, 6A), the handle 817 is configured so that the user can manipulate the spool carrier 815 and an attached spool 505 (i.e., to engage the carrier and spool to the frame 110, or to remove the carrier and spool from the frame, or to hand carry the spool carrier and spool). In this position, the pin 826 is received in a bottom end of the longer vertically extending channel section 824a and interacts with the sides of the channel 824 to prevent rotation of the handle 817. The pin/channel interaction also prevents the handle grip portion 817a from separating (through longitudinal movement along its axis A-A in the direction of arrow "C") from the cylindrical attachment tube 817b.

Once the spool carrier 815 has been coupled to the frame 110, the handle 817 can be moved to the stowed position (FIGS. 5B, 6B) by pushing downward on the handle grip portion 817a to move it slightly in the direction of arrow "D", and then rotating the handle portion in the direction of arrow "B." This action first translates the pin 826 upward in the vertical channel section 824a, then moves the pin through the angular channel section 824c, and finally seats the pin in the terminus of the angular section which may include a recess to receive the pin. Rotational movement of the handle grip portion 817a also causes the lateral stub 828 at the upper end of the attachment tube 817b to be received within the recess 830 in the frame 110. In the illustrated embodiment the handle grip portion 817a is rotatable by about 90° to move the handle from the deployed position to the stowed position. With the handle 817 in the stowed position the spool hub engaging portion 822 of bracket 835 is locked so that it cannot be disengaged from the frame 110. Reverse rotation and extension of the handle grip portion 817a will return the handle to the deployed position, whereupon the handle can be used to disengage the spool carrier 815 and welding wire spool 505 from the frame 110.

Each of the disclosed transportable spool carriers 515, 815 is advantageous over what is used for existing welding tractors in that it allows a user to safely and easily transport, attach, and/or detach a welding wire spool 505 with respect to a welding tractor 100 or other appropriate structure. As noted, a fully loaded welding wire spool 505 can be extremely heavy. With the disclosed arrangement a user may mount the welding wire spool 505 on the transportable spool carrier 515, 815 so that the welding wire spool 505 can be lifted and carried using the handle 615, 817a and more easily mounted on the welding tractor 100 or other structure as compared to prior arrangements. Carrying a heavy welding wire spool 505 via the handle portion 615, 817a alongside the user's body instead of in front of it is more ergonomic and avoids user strain and possible injury. With the disclosed embodiments, the user can also quickly attach the spool carrier to and detach the spool carrier from the frame 110 of the welding tractor 100 via the brackets 135 835 without having to bend over. This is ergonomically advantageous and provides comfort and easier operation for users over existing welding tractors, as well as requiring less downtime between welding operations.

As used herein, an element or operation recited in the singular and proceeded with the word "a" or "an" should be understood as not excluding plural elements or operations, unless such exclusion is explicitly recited. Furthermore, references to "one embodiment" of the present disclosure are not intended to be interpreted as excluding the existence of additional embodiments that also incorporate the recited features.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A transportable spool carrier for carrying a welding wire spool, comprising:
a carrier frame having a top, a bottom, and a support portion disposed between the top and the bottom, the support portion of the carrier frame being configured to support the transportable spool carrier when removably coupled to a bracket extending vertically from a portion of a frame of a welding tractor;
a spool hub secured to the carrier frame, said spool hub having an axis and configured to coaxially receive and be selectively coupled to a welding wire spool having an annular outer edge of known radial distance from said axis; and
a handle disposed a distance above the spool hub greater than said known radial distance to facilitate lifting and carrying the welding wire spool via the transportable spool carrier.

2. The transportable spool carrier of claim 1, wherein the handle is vertically aligned with a longitudinal center portion of the axis of the spool hub to thereby align the handle with a center of gravity of the welding wire spool when the welding wire spool is coupled to the spool hub.

3. The transportable spool carrier of claim 2 wherein said handle is oriented orthogonally to the axis of the spool hub.

4. The transportable spool carrier of claim 1, further comprising first and second feet at the bottom of the carrier frame configured to support the welding wire spool on a horizontal surface.

5. The transportable spool carrier of claim 4, wherein the support portion of the carrier frame is disposed between the handle and the first and second feet, the support portion configured to selectively couple the transportable spool carrier to the frame of the welding tractor.

6. The transportable spool carrier of claim 1, wherein the spool hub is configured to be selectively positionally locked to the welding wire spool.

7. The transportable spool carrier of claim 6, wherein the spool hub includes a radially expandable cylinder such that in a first configuration the welding wire spool is axially slidably mountable onto the spool hub, and in a second configuration the spool hub is radially expanded to lock the welding wire spool to the spool hub.

8. A welding tractor system, comprising:
a tractor comprising:
a base;
a frame coupled to the base; and
an attachment member coupled to a vertically extending portion of the frame; and
a transportable spool carrier comprising a carrier frame having a first foot and a handle, the transportable spool carrier configured to receive a welding wire spool thereon;
wherein the attachment member is configured to removably couple to the carrier frame between the handle and the first foot.

9. The welding tractor system of claim 8, wherein the welding wire spool has a rotational axis and an annular outer edge of known radial distance from said rotational axis, and further comprising:
a spool hub having a spool hub axis and configured for receiving the welding wire spool coaxially thereon;
wherein the handle is spaced above the spool hub axis by a distance greater than said known radial distance such that the welding wire spool is transportable via the transportable spool carrier.

10. The welding tractor system of claim 9, wherein the handle is vertically aligned with a longitudinal center portion of the spool hub to thereby align the handle with a center of gravity of the welding wire spool when the welding wire spool is coupled to the transportable spool carrier.

11. The welding tractor system of claim 8, wherein the first foot is configured to support the welding wire spool when the transportable spool carrier is detached from the frame and placed on a horizontal surface.

12. The welding tractor system of claim 8, wherein the carrier frame further comprises a support member configured for selectively engaging the attachment member.

13. The welding tractor system of claim 8, wherein:
the transportable spool carrier further comprises a spool hub for receiving the welding wire spool;
the spool hub has a generally cylindrical configuration with a longitudinally extending spool hub axis; and
the handle is disposed at a top end of the transportable spool carrier vertically aligned above a longitudinal center portion of the spool hub axis to align the handle with a center of gravity of the welding wire spool when the welding wire spool is coupled to the transportable spool carrier.

14. The welding tractor system of claim 13 wherein said handle is selectively movable between a deployed position and a stowed position, and wherein the handle is parallel to the spool hub axis when in the deployed position.

15. The welding tractor system of claim 13 wherein said handle is oriented orthogonally to the spool hub axis.

16. The welding tractor system of claim 8, further comprising a second foot disposed at a bottom end of the transportable spool carrier opposite the first foot, the first and second feet configured to stably support the transportable spool carrier on a substantially horizontal surface when the transportable spool carrier is decoupled from the tractor.

17. A method of removably mounting a welding wire dispensing spool on a welding tractor comprising:
aligning a through hole of a dispensing spool with a hub of a spool holder;
translating the dispensing spool along the hub of the spool holder to couple the spool holder to the dispensing spool;
aligning a support member of a holder frame of the spool holder with an attachment member-coupled to a vertically extending portion of a frame of the welding tractor; and
translating the support member of the holder frame into engagement with the attachment member, wherein a portion of the holder frame is disposed below the attachment member when the support member is engaged with the attachment member.

18. The method of claim 17, further comprising vertically aligning a handle with an axially central portion of the hub with the handle orthogonally oriented to the hub.

19. The method of claim 17, further comprising vertically aligning a handle with an axially central portion of the hub with the handle extending parallel to the hub.

* * * * *